UNITED STATES PATENT OFFICE.

LOUIS S. ROBBINS, OF NEW YORK, N. Y.

PREPARING BARRELS TO CONTAIN PETROLEUM, COAL-OIL, &c.

Specification forming part of Letters Patent No. 42,598, dated May 3, 1864; Reissue No. 1,847, dated January 3, 1865.

*To all whom it may concern:*

Be it known that I, LOUIS S. ROBBINS, of the city and State of New York, have invented a certain new and useful improvement in preparing casks to contain crude and refined petroleum or coal-oils and fluids of a volatile nature; and I do hereby declare the following to be a full, clear, and exact description thereof.

My invention and improvement consists in saturating the outer surface of the casks with oils and the inner surface with a strong alkaline solution, or with soapsuds; and it also consists in saturating the whole with the alkaline solution or soap-suds alone.

To enable others skilled in the art to practice my invention, I will proceed to state that I employ linseed or any other of the fixed oils for the treatment of the outside of the cask, and as it is essential that it should penetrate the wood from the outer surface for a portion of the distance toward the inner surface thereof, to facilitate the operation I place a sufficient quantity of the oil in a vat or reservoir of suitable dimensions to permit the cask to be submerged or revolved in the oil until all the outer surface of the wood becomes saturated to the extent desired, care being taken, however, not to allow the saturation by oil to reach the inner surface of the cask. The outer surface of the wood may be thus sufficiently saturated by the use of cold oil; but as this would take considerable time I further facilitate the process by constructing the vat or reservoir of iron or other suitable metal, and set it into a furnace or provide it with other convenient means for heating the oil, and heat the oil to any practicable temperature desired. I have found in practice 150° Fahrenheit for old casks, or casks made out of seasoned wood, and 200° for casks made of unseasoned wood, the most suitable temperature.

The cask, with its hoops driven home and the bung-hole securely closed, is placed in the vat or reservoir, and either submerged or revolved in the oil until the outer surface is sufficiently saturated, then drained and removed to allow others to be successively treated in the same manner. I next introduce into the cask a strong alkaline solution, or a hot soapsuds. If filled, the cask may remain at rest; but if only partially filled it should be rolled or turned over, so as to bring the alkaline solution or soapsuds in contact with all parts of the wood as much as possible, until every part is saturated as far as the oil will permit it to penetrate. When sufficiently saturated, the alkaline solution or soapsuds remaining is emptied into a proper receptacle, and may be used for a like operation on other casks.

When the cask is treated without the application of oil, the alkaline solution or soapsuds may be applied in the manner above provided for that purpose, or the cask may be submerged into the preparation, or both filled with and submerged into it; and although this treatment will not be as effectual or render the cask as durable as the joint treatment of oil and alkaline solution or soapsuds as heretofore provided, it will answer the purpose to a great extent, and is far superior to any other mode now in use.

The advantages of my invention and improvement are, first, that the oil applied to the outer surface of the cask and penetrating a short distance into the wood renders the same impervious to moisture, and the influences of the atmosphere greatly adds to its durability, and prevents shrinkage and other changes detrimental to casks used to contain coal-oil, petroleum, and volatile fluids; and, secondly, it prevents the water of the alkaline solution or soapsuds from passing through the pores of the wood. The effect of the alkaline solution or soapsuds is to swell or distend the wood in a remarkable degree by entering into combination with it; and when used in combination with the treatment above provided for the oil it is kept from passing outward by the oil on the outside and from passing inward by the oil contained in the cask.

Having thus fully described my invention and the mode of applying it, what I claim as new, and desire to secure by Letters Patent, is—

1. The combination formed by saturating the entire outer surface of the cask with oil and the inner body of the staves and heads with an alkaline solution, or with soapsuds, substantially as and for the purpose set forth.

2. Saturating the staves and heads of the casks with a strong alkaline solution or with soapsuds, as and for the purposes above specified.

Witnesses: LOUIS S. ROBBINS.

A. A. TAYLOR,

GEO. S. DWIGHT.